United States Patent [19]

Torkelsen et al.

[11] Patent Number: 4,460,975

[45] Date of Patent: Jul. 17, 1984

[54] EASILY ACCESSIBLE FORMATING OF COMPUTER PRINTOUTS

[75] Inventors: John B. Torkelsen, Princeton; Kevin M. Hoolihan, Plainsboro, both of N.J.

[73] Assignee: Saga Data, Inc., Princeton, N.J.

[21] Appl. No.: 420,182

[22] Filed: Sep. 17, 1982

[51] Int. Cl.³ ............................................. G06F 3/12
[52] U.S. Cl. ................................................... 364/900
[58] Field of Search ........................ 364/900 MS File

[56] References Cited

U.S. PATENT DOCUMENTS

4,097,924 6/1978 Figini ................................. 364/900
4,425,629 1/1984 Cason et al. ..................... 364/900

*Primary Examiner*—Raulfe B. Zache
*Attorney, Agent, or Firm*—Russell J. Barron; Lester J. Savit

[57] ABSTRACT

A process for allowing non-programmers to generate customized formats for computer printouts according to user specifications. The process allows a user to create a report or other formatted representation of data by responding to a sequence of prompting stimuli. Each stimulus is presented to the user by a computer processor in combination with a menu of command choices or in combination with instructions for responding by alphanumeric command or designation. The sequence of prompting stimuli is dependent on previous command choices to present only relevant stimuli to the user. A list of generic default format commands specifies parameters not specified by the user. Consequently, the user needs to respond only to a few stimuli in order to generate a completely formatted representation of data. The generic default format commands may be changed and stored in the long-term memory as custom default format commands for easy and quick retrieval and regeneration of desired formats with updated data or with other variations. The process is accomplished by a transfer of default format commands from the long-term memory to the processor memory followed by modification of the default format commands by the user's commands given in response to the prompting stimuli. The series of commands are converted to electrical impulses suitable to direct a printer to print out the designated data according to the specifications of the user.

52 Claims, 4 Drawing Figures

EASILY ACCESSIBLE FORMATING OF COMPUTER PRINTOUTS

BACKGROUND OF THE INVENTION

The invention pertains to computer generated printed representations of data. In particular, the invention relates to processes for interfacing a non-programmer user with a digital computer to produce a desired format of a computer printout.

The invention is ideally suited for quick and easy generation and regeneration of business and economic reports containing lists of data and transformations of data. It is also well suited for incorporation as part of a broader computer program including aspects of co-pending patent application Ser. No. 409,783.

In the past, computers have been used to format business reports or other types of representations or tables of data. Such formatting is very desirable because it produces printouts of raw or transformed data that are easily understood and further facilitates comparison of categories of data or transformations of categories of data. However, past programs for formatting computer printouts have required that the user know the specific language used by the program. Only a computer programmer skilled in the use of these languages or a non-programmer extensively trained in a specific formatting language could generate desired formats of computer printouts. For example, universal computer languages such as FORTRAN and COBOL have been used to format printouts in the past. Also, commercial software formatting packages such as Impact, created by United Information Services, and Focus, created by Information Builders, Inc. are available. However, both universal computer languages and previous commercial software formatting packages require many pages of user instruction with which the user must familiarize himself before becoming proficient enough to generate even the simplest desired formats. Consequently, prior to the present invention, only programmers or other users willing to spend the considerable time and energy necessary to learn how to use a complex computer language and syntax were able to specify formats for computer generated reports or tables.

It is an object of the present invention to provide a process for making formatting of computer printouts accessible to non-programmer users.

It is another object of the present invention to provide a process for non-programmer users to be able to generate, store and retrieve user specified formats of computer printouts of data.

It is another object of the present invention to provide a process for quickly and easily regenerating customized formats of computer printouts with new or updated data.

It is a further object of the present invention to provide a process utilizing a logical sequence of prompting stimuli to create a list of user commands to be combined with stored default format commands to specify the entirety of a format of a computer printout of data in a short period of time.

It is yet another object of the present invention to provide a system and a process for generation of computer printout formats according to non-programmer user specifications giving the user control to modify a great number of parameters of the format.

It is yet another object of the present invention to provide a process for teaching non-programmer users how to specify the desired format at the same time the user first attempts to produce a format for a computer printout.

The foregoing and other objects, features, and advantages of this invention will be apparent from the following descriptions and illustrations of the preferred embodiment of this invention.

SUMMARY OF THE INVENTION

The present invention provides a process and a system for generating an infinite variety of formats of computer displays of selected data from a variable number of prompted user commands. The user may define a format, specifying only a few parameters such as designation of data, frequency of data to be printed and interval of time to be represented. The user may, alternatively, define a format specifying a great number of parameters such as titles, subtitles, footnotes and other details. The user may print out data according to a previously defined format by specifying only frequency of data points and the interval of time to be represented.

The process utilizes a general purpose digital computer having a processor with a memory. The processor communicates with a long-term memory and a user operated terminal. The terminal communicates with a printer for printing the data in a specific format.

The revolutionary results of the present invention are produced by a method for easily compiling user commands with computer supplied default format commands to specify all the parameters necessary to generate a completely formatted printout. The user need only respond to a sequence of prompting stimuli to generate the commands needed to produce the desired format. The sequence of prompting stimuli is a logical progression dependent upon previous user command choices. In this manner, the user is presented with only relevant stimuli and command choices. Consequently, the sequence of prompting stimuli is as long or as short as necessary for the user to specify desired changes or additions to the default format commands without the user needing to consciously decide what needs to be changed in advance of being presented with the appropriate stimulus. Once a desired format has been generated, the command list can be stored in long-term memory for latter retrieval and regeneration with new or updated data.

The generic default format commands are stored in the long-term memory. At the beginning of program, the default format commands are reproduced in the processor memory. The default format commands are then modified and supplemented according to user commands selected from menus of command choices presented in combination with prompting stimuli.

A prompting stimulus may require the user to respond in one of several ways to the prompting stimulus. If the prompting stimulus is presented in combination with a menu of command choices, the user may respond by designating one of the commands listed on the menu. Normally this is done by depressing the terminal keys corresponding to the first or first two letters of the command words. If the prompting stimulus seeks to elicit a designation of data or other text in the body of the format, the user may respond by depressing the terminal keys corresponding to a desired data base and mnemonic designating the data within the data base to be printed on a line. Alternatively, a specific transformation of the data may be printed. Also, the user may designate by alphanumeric command that a line contain a subhead or some other labeling. If the user does not know what options of response are available, a question mark response will result in the computer instructing the user as to what alphanumeric commands may be designated. Similarly, proper syntax, where necessary, is taught when the question mark is designated by the user. If the prompting stimulus indicates that the user may designate a word or label to be printed on the printout, such as a title, footnote, subhead or other label, the user may simply key the appropriate letters spelling the label on the terminal keyboard.

The user may enter the data to be represented directly into the processor memory or may designate data stored in the long-term memory. Designated data stored in the long-term memory is reproduced in the processor memory upon the appropriate user command. The user need only specify the parameters which the user desires to be different from the default parameters and the data to be included in the body of the printout.

Upon command, the processor converts the list of commands into electrical impulses to direct a printer to print out the data according to the specified parameters. Prior to converting the data, the processor presents the user with two prompting stimuli. First, the user is presented with a choice of frequency of data in combination with a menu of command choices, e.g., monthly, quarterly or annually. Second, the user is presented with a choice of interval of time to be included in the format in combination with a space to designate the appropriate time span, e.g., if monthly frequency is selected then beginning month and year and ending month and year are to be designated.

After the frequency and interval have been designated, the processor automatically compiles the designated data from the long-term memory into the processor memory. The list of commands, e.g., the default format commands modified and supplemented by user commands, is then electronically converted into electrical impulses to direct a printer to print out according to the specified parameters.

The list of commands automatically generating a desired format may be saved for later reference in the long-term memory. Such a list of user commands incorporated into generic default format commands are custom default format commands. If a user so chooses, the custom default format commands can be instantly retrieved from the long-term memory and further modified or supplemented as desired. In this manner, either a previously defined format or a modification of a previously defined format may be generated in a very short period of time.

The default format commands are stored separately from the data but not separately from data designation. Consequently, the desired format can be regenerated by a secretary or other agent of the original user at a later time with updated or new data. After the original user defined the desired format, periodic printouts are a simple, quick ministerial task. Many different sets of custom default commands may be stored in the long-term memory for later retrieval. Accordingly, a whole set of reports can be custom designed by an original user and periodically updated by agents of the user.

BRIEF DESCRIPTION OF THE DRAWINGS

A better understanding of the invention may be had from a consideration of the following detailed description taken in conjunction with the following drawings, in which.

DETAILED DESCRIPTION OF THE INVENTION

Figure 1:
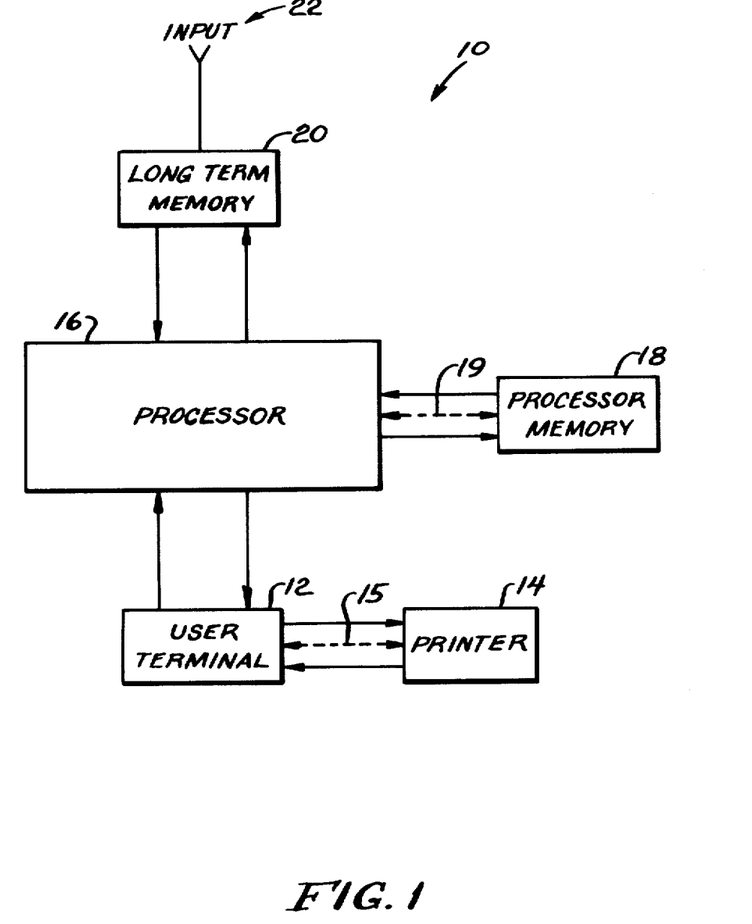
FIG. 1 is a schematic diagram showing the preferred arrangement of component parts used in practice of the present invention.

The process and system of the present invention may be understood by reference to the diagrams described above. Referring to FIG. 1, the general arrangement of component parts is depicted by the numeral 10. The processor 16 can be any general purpose computer but, preferably, is a main frame digital computer such as the IBM 370. The processor 16 has a processor memory 18 which is used for storage of information such as the object code, data, and commands. The processor memory 18 is the work space of the processor, that is, the transformations run on information are done in the processor memory 18. While FIG. 1 shows the processor memory as separate from the processor, in fact processor memory 18 will normally be part of the processor as indicated by the double headed arrow 19 between processor 16 and processor memory 18.

The processor 16 further communicates with the long-term memory 20. Long-term memory 20 is used to store software, command lists, data, and other information which can be retrieved by the processor 16, and reproduced on the processor memory 18 for desired transformations. Normally, information in the long-term memory 20 can be retrieved any number of times without erasing the information in the long-term memory 20. Information can be entered into the long-term memory by direct input 22 into the memory or by entry through the processor 16. Direct input 22 may be accomplished by entry on discs carrying the information or by recordation on any memory storage device. Information may also be entered into the long-term memory 20 through the processor 16 from the processor memory 18 or from the user terminal 12. In this manner, the user can enter information into the long-term memory 20 by direct transcription. Or, alternatively, information can be compiled on the processor memory 18 by the user and then transferred in bulk into the long-term memory 20.

The user terminal 12 communicates both with the processor 16 and a printer 14. The printer 14 may be incorporated between the processor 16 and user terminal 12 or as a separate component, as shown in FIG. 1. Alternatively, the printer may be incorporated in the user terminal as indicated by the double-headed arrow 15 between user terminal 12 and printer 14.

The printer 14 may be any device for printing letters or words. Such devices include user terminals with any type of output device, daisy wheel printers, ink jet printers, computer controlled typewriters as well as any other electromechanical printers. Alternatively, the printout could appear on a CRT or other "soft" display. Later, this soft display could be transformed to "hard" copy by photograhic or other methods. The present invention is not limited to use of only the above listed type printers but further contemplates that any method of printing can be incorporated into the system. In fact, the system could direct any type of commercial computer controlled printer which can be driven by electrical impulses. New printers developed in the future could be easily incorporated into the system because of industry standardization of the printer code.

A user communicates with the processor through the user terminal 12, which usually contains a keyboard having alphanumeric keys. The user is preferably a human being, but, alternatively, could be another computer or electronic or electromechanical device.

The process allows non-programmer users to compile a list of specifications and both generate printouts from those specifications for later modification or regeneration of the printout. This increase is accessibility of the format of a printout is accomplished by a process involving several steps.

In particular, after the user has begun communicating with the processor 16 and designates the report generator program, the process of user specification of the desired format starts.

The user is confronted with a sequence of prompting stimuli generated by the processor 16. Preferably, the prompting stimulus is a descriptive word presented on a video screen but, alternatively, it could be a picture, an audio stimulus, a depiction of a report or any other indication of the decision to be made. The stimulus can be presented by either a video device, an audio producing device, or any other device or method of indicating to the user that a certain decision is to be made and that the processor 16 awaits the user's decision.

Each prompting stimulus is presented in combination with a menu of command choices or instructions for an alphanumeric response. Preferably, the menu of command choices is a list of descriptive words presented in combination with the prompting stimulus on a video monitor but, alternatively, it could be presented in any manner in which the stimulus can be presented, as discussed above. The descriptive words describe the command they represent. Commands are selected from each menu by choosing the first or first two letters of the descriptive words. Preferably, this is accomplished by depression of the keys representing the appropriate letters on the terminal 12 keyboard. However, the entire descriptive word is recognized by the processor so that entry of an inappropriate command word coincidentally having first letter or letters corresponding to a command found on the menu will not be confused as the menu command choice. If the user does not wish to change the default command because it is the desired command or because the user does not wish to take the time to specify parameters of the format, the user may choose to not respond and depress the send signal. The sequence progresses as if the default format command was selected by the user.

The user may also designate an alphanumeric response when appropriate by "typing" or keying the response word on the keyboard of the user terminal. If the user is learning to use the program or is otherwise confused, an entry of a question mark will result in the processor presenting brief instructions of user options to the stimulus and/or appropriate syntax required to properly respond to the stimulus. It will also, where appropriate, give instructions on what keywords may be used and what syntax is required for a coherent response. The sequence of prompting stimuli does not progress until a recognizable user response is made.

Figure 2:
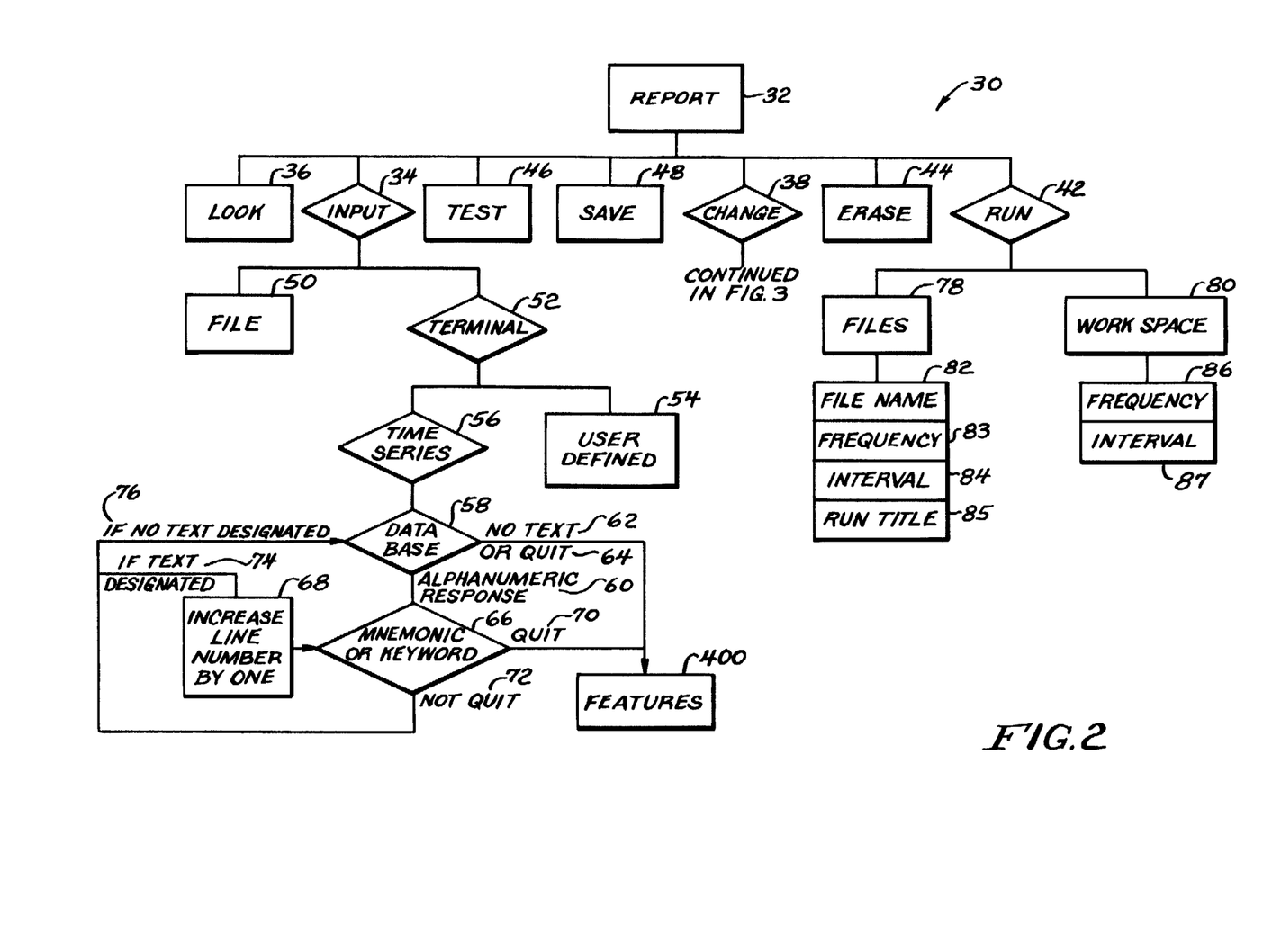
FIG. 2 shows a flow diagram of the sequence of prompting stimuli.

The sequence of prompting stimuli is a logical progression related to the particular commands previously chosen by the user. Referring now to FIG. 2, the sequence of prompting stimuli is generally indicated by number 30. After the user logs on to the report format program 32, the user is presented with the stimulus indicating that a choice of operations is to be made, such as the word "report" or "format." The stimulus is prescribed in combination with a menu of command choices indicating different operations. The menu list of the descriptive words includes: "input" 34, indicating that the user wishes to input commands; "change" 38, indicating that the user wishes to change a set of commands; and "run" 42, indicating that the user wishes to print out a list of commands present in the processor memory 18 or the long-term memory 20. In addition, other operations listed on the menu could be: "look" 36, directing the processor 16 to present the list of commands for review; "save" 48, directing the processor 16 to save the list of commands found in the processor memory 16 in the long-term memory 20; "erase" 44, directing the processor 16 to erase a specified list of commands; and "test" 46, directing the processor to print out the format without the data.

The user selects the input operation by depressing the "i" key on the keyboard and then sends the signal to the processor. The user is subsequently presented with a prompting stimulus indicating that a choice of a source of the input is to be made. This, preferably would be the word "input." The prompting stimulus "input" 34 is presented in combination with a menu of command choices "file" 50, indicating that the source is a file containing previously stored commands, and "terminal" 52, indicating that the commands will be produced on the terminal.

If the user selects the terminal source, by depressing "t" on the keyboard, the user is presented with a prompting stimulus indicating that a choice of type of format definition mode is to be made. A menu of command choices is also presented. The menu includes "user defined" 54, directing that the user is an experienced user familiar with the computer language and that the user desires less prompting of responses, and "time-series" 56, directing that the user is inexperienced and desires maximum interaction between user and processor 16.

If the user selects the user defined 54 command, the user is free to specify parameters without the necessity of going in order of the sequence of prompting stimuli. This allows the user who is familiar with the language of the program to avoid passing through parts of the sequence to get to the part that is desired. In this manner, a user who has used the process many times before will not be slowed down by the remedial nature of the sequence. Consequently, anyone, skilled or non-skilled, can use the process but all users will be able to move through the sequence at a rate corresponding to his familiarity with the system.

If the user selects the "time-series" 56 command, the user is presented with a prompting stimulus indicating that a choice of text to make up the body of the printout is to be made. The user is presented with a stimulus indicating that a choice of data base 58 is to be made. If the user designates an data base by keying in an alphanumeric response 60, the user is next presented with a prompting stimulus indicating that a designation of text 66 is to be made. If the user responds by selecting nothing 62 and hitting the send signal or "q" for quit 64 and the send signal, the sequence of prompting stimuli continues through the features 400 selection of the sequence.

The prompting stimulus indicating that a designation of text 66 is to be made is preferably the words mnemonic or keyword presented to the user. A mnemonic is an alphanumeric designation of data stored within the data base specified as a response to the data base 58 prompting stimulus. The mnemonic designation will direct the computer to print the data on the designated line. A keyword, on the other hand, is an alphanumeric designation of a transformation of data or a non-data entry on to a specified line. If the user is not familiar with the possible keywords options, the question mark response results in a complete description of each possible keyword. For example, the preferred embodiment includes keywords "&BLANK," inserting a blank line into the report; "&CENTER," inserting a centered labeled line without data; "&NEWPAGE," starting next line on a new page; "&SUBHEAD," inserting a labeled line without data; "&%," inserting percent change from the previous period; "&%P," inserting percent change from the same period of the previous year; "&%A," inserting compound annual growth rate; "&REPEAT," beginning repeating line definition for each keyword and mnemonic designated by the user; "&END," ending repeating line definition; "&LIST," identifying a list of mnemonics-file name immediately follows; "&MNCLAB," indicating whether to print mnemonics on a line above label; and "&LABMNC," indicating whether to print labels on a line above mnemonics. Of course, the present invention is not limited to these keywords or operations but contemplates use of different keywords and further operations than those listed.

If the user designates text, e.g., a keyword or a mnemonic, the processor increases the line number by one 68 and again presents the prompting stimulus, this indicating that line two of the text is to be designated by a keyword or mnemonic. This process is repeated as long as a keyword or mnemonic is designated for each line. The text of each line of the body is designated in order. If the user completes this process the "q" or quit 70 key is depressed and the sequence of prompting stimuli continues to the features 400 section.

If the user desires to change a data base, the user depresses the send signal only, designating neither keyword, mnemonic nor "quit." The user is then again presented with the prompting stimulus indicating that a data base is to be designated.

FIG. 2 shows this process of designating the text of the body of the report line-by-line as a series of logical "loops". As previously discussed, the user may continue designating keywords and mnemonics as long as a keyword or mnemonic is entered as a response. If the user desires to exit the "loop", the user can designate "q" 64 and 70 to enter the features 400 sequence. This is also accomplished by designating no response 62 when a data base 58 designation is requested by the processor 16. If "q" is not designated 72 when a mnemonic or keyword 66 is requested, the user will remain in the loop. If the text was designated 74 by the user, the line number is increased by one and the user is again presented with the prompting stimulus indicating that a mnemonic or keyword 66 is to be designated. If text was not designated 76, the user is presented with the prompting stimulus indicating that a designation of a data base 58 is to be made.

Figure 4:
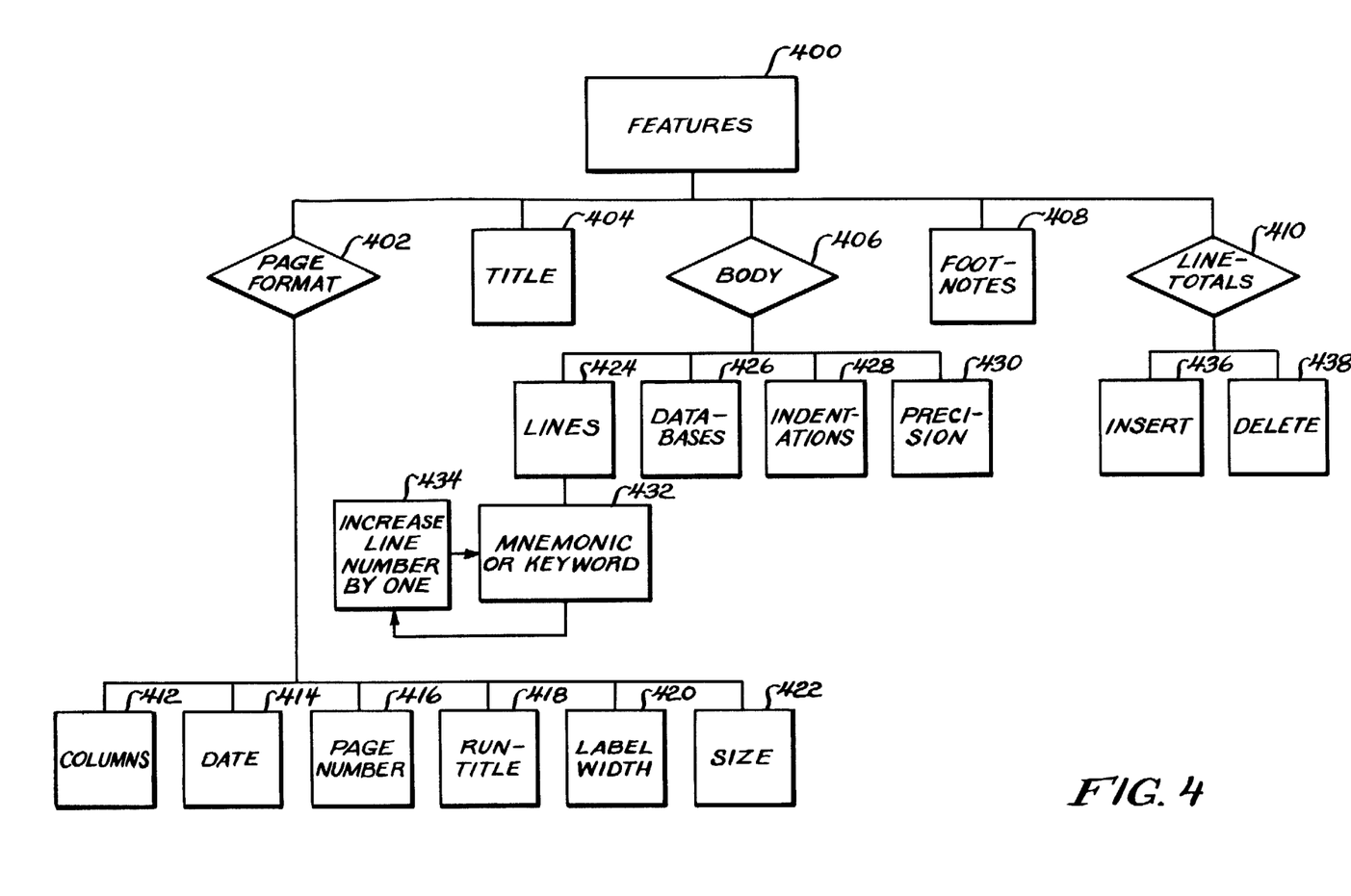
FIG. 4 shows a detailed flow diagram of prompting stimuli depicted as "features" in FIG. 1.

Referring to FIG. 4, when the user has finished designating lines of text in the body of the report, the features 400 sequence is represented. A prompting stimulus indicating that the user may now specify further format features of the report is presented in combination with a menu of command choices including "page format" 402, directing that the page format is to be specified; "title" 404, directing that the title is to be specified; "body" 406, directing that the body of the report is to be specified; "footnotes" 408, directing that the footnotes or text below the body of the report is to be specified; and "line-totals" 410, directing that columns of totals of a quarter of a year or a year be displayed in the body.

If the user selects the page format 402 command, the user is presented with a prompting stimulus indicating that a choice of type of change to the page format is to be made. The stimulus is presented in combination with a menu of command choices including "columns" 412, directing that the width or spacing of the columns be changed; "date" 414, directing that the position of the date be changed or the date eliminated; "page number" 416, directing that the position of the page number be changed or the page number eliminated; "run-title" 418, directing that a run title be included in the title of report, the title to be specified at the time of command or at the time of printing out; "label width" 420, directing the maximum space allotted for labels of the data entered in the lines of text; "size" 422, directing that the length and width of the printout is to be specified.

If the user selects the body 406 command, the user is presented with a prompting stimulus indicating that a choice of type of change to the body format is to be made. The prompting stimulus is presented in combination with a menu of command choices including "lines" 424, directing that more lines of text are to be added; "data bases" 426, directing that a new data base is to be designated; "indentations" 428, directing that a line or lines are to be indented from the left margin; and "precision" 430, directing that the number of digits to the right of the decimal in the data of a line or lines are to be specified by the user. If the user selects the lines 424 command the user is presented with a prompting stimulus indicating that a mnemonic or keyword 432 is to be designated. As long as a mnemonic or keyword is designated the prompting stimulus again is presented indicating a line number, each time the line number is increased by one 434.

If the user selects the line-totals 410 command, the user is presented with a prompting stimulus indicating that a choice of whether to insert or delete a line total is to be made. The prompting stimulus is presented in combination with a menu of command choices including "insert" 436, directing that a line total be inserted in the body of a report, and "delete" 438 directing that a line total be deleted from the body of a report.

Figure 3:
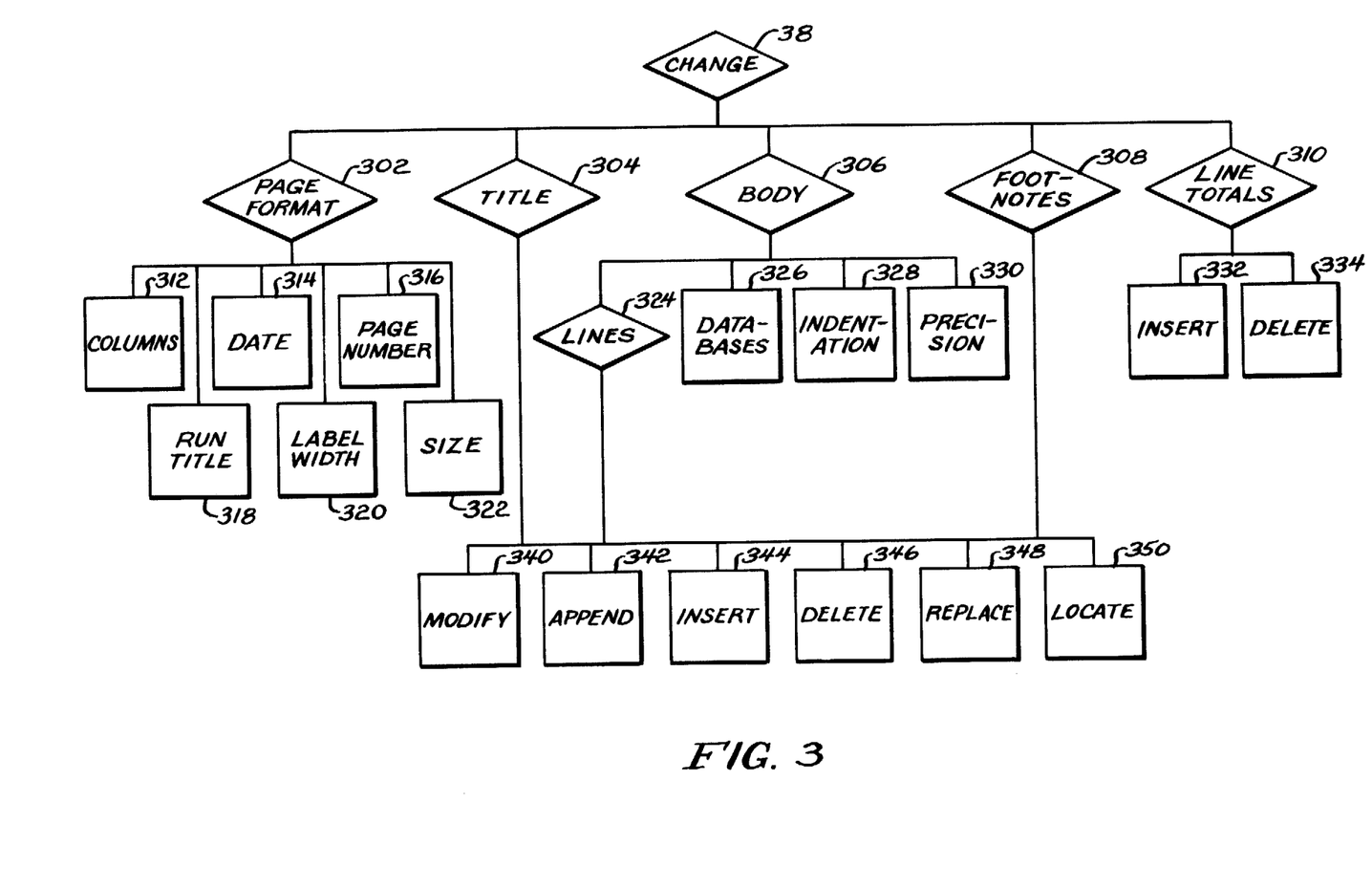
FIG. 3 shows a continuation of the flow diagram of the sequence of prompting stimuli depicted as "change" in FIG. 2.

Referring now to FIGS. 1 and 2 in conjunction with FIG. 3, the user may select change 38 if the user desires to change a set of commands present in the processor memory 18. If the user selects the change 38 command, the user is presented with a prompting stimulus indicating that a choice of part of the format to be changed is to be made. The prompting stimulus is presented in combination with a menu of command choices including "page format" 302, directing that the format of the page is to be changed; "title" 304, directing that the text of the title is to be changed; "body" 306, directing that the body of the report is to be changed; "footnotes" 308, directing that the footnotes or text below the body is to be changed; and "line-totals" 310, directing that columns of totals of a year or part of a year be included or taken out of the body.

If the user selects the page format 302 command, the user is presented with a prompting stimulus indicating that a choice of type of change to the page format is to be made. The stimulus is presented in combination with a menu of command choices including "columns" 312, directing that the width or spacing of the columns be changed; "date" 314, directing that the position of the date be changed or the date eliminated; "page number" 316, directing that the position of the page number be changed or the page number eliminated; "run-title" 318, directing that a run title be included in the title of report, the title to be specified at the time of command or at the time of printing out; "label width" 320, directing the maximum space allotted for labels of the data entered in the lines of text; "size" 322, directing that the length and width of the printout is to be specified.

If the user selects the body 306 command, the user is presented with a prompting stimulus indicating that a choice of type of change of the body format is to be made. The prompting stimulus is presented in combination with a menu of command choices including "lines" 324, directing that lines of text are to be changed; "data bases" 326, directing that the data base designation is to be changed; "indentations" 328, directing that indentations of a line or lines from the left margin are to be changed and "precision" 330, directing that the number of digits to the right of the decimal in the data of a line or lines are to be changed.

If the user selects the line-totals 310 command the user is presented with a prompting stimulus indicating that a choice of whether to insert a line total or to delete a line total is to be made. The prompting stimulus is presented in combination with a menu of command choices including "insert" 332, directing that a line total be inserted in the body of the report and "delete" 334, directing that a line total be taken out of the body of the report.

If the user selects the title 304 command, the footnote 308 command or the lines 324 command, the user is presented with a prompting stimulus indicating that a choice of type of change to the title, footnote or lines, respectively, is to be made. The prompting stimulus is presented in combination with a menu of command choices. These command choices are the editing functions. A question mark or "function" designation in this part of the sequence results in presentation to the user of instructions of which editing functions are available, what their function is, and the required syntax to make a coherent entry. The editing functions listed on the menu may include "modify" 340, directing that a line be changed as specified; "append" 342, directing that a line be appended to the end of a line as specified; "insert" 344, directing that a specified insertion be made in a line; "delete" 346, directing that a specified line be taken out; "replace" 348, directing that a specified entry be replaced by another in a line; and "locate" 350, directing that a line with a specified entry be located.

Of course, the present invention is not limited to the specific words or operations of the editor listed here. It contemplates that any number of standard editing functions could be included into this list as useful commands. For example, other functions such as "up", directing the editor to move up a specified number of lines; "go," directing the editor to go to the specified line; "bottom," directing that the editor go to the last line of the body of the format; and "top", directing the editor to go to the first line of the body. Similarly, the descriptive names used here could be different. For example, "modify" could be "change", "append" could be "add" and "locate" could be "find".

If the user selects the run 42 command, the user is presented with a prompting stimulus indicating that a choice of source of commands to be printed out is to be made. The prompting stimulus is presented in combination with a menu of command choices including "files" 78, directing that the printout be made from commands found in the long-term memory, and "work space" 80, directing that the printout be made from commands found in the processor memory 18.

If the user selects the files 78 command, the user is presented with a sequence of four prompting stimuli indicating that the user is to designate the file name 82 of the list of commands stored in the long-term memory and desired to be retrieved, frequency 83 of data points to be printed in the body, interval 84 of time to be represented in the report, and run title 85 of the printout.

If the user selects work space as the source of the list of commands, the user is presented with two prompting stimulus indicating that the frequency 86 of data points is to be designated and that the interval 87 of data to be represented in the report is to be specified.

The distinction between command descriptive words and the correlated command should be clarified. Each menu of command choices in the preferred embodiment contains a list of descriptive words which describe the command directed or indicated. This descriptive word, indicated by quotation marks, should not be confused with the command it represents. The invention is not limited to the particular descriptive words in the menus, but contemplates use of any word, signal, or other form of communication to the processor 16 which indicates the command choice desired by the user. However, the particular words used in the preferred embodiment were chosen to represent the specific commands they direct. For purposes of this application, use of a descriptive word designates the command represented by the descriptive word and not the descriptive word, unless the descriptive word is enclosed in quotation marks.

The present invention is not limited to specific menus of command choices described above but contemplates use of command choices in addition to those listed in the menus. In particular, additional graph-types, plots and charts can be added to increase user options of type of graphic representation to display data.

In the preferred embodiment of the present invention, a set of generic default format commands are initially stored in the long-term memory 20. Upon appropriate user command at the beginning of the format program the generic default format commands are reproduced in the processor memory 18 electronically by the processor 16. The commands selected from the menus presented in combination with the prompting stimuli modify the default format commands in the processor memory 18. Alphanumeric keywords, mnemonics and labels are also incorporated into the command list. The user can move through the sequence of prompting stimuli as the logical sequence progresses, only needing to specify parameters which the user desires to be different from the generic default format commands. The user may also move upward one step in the logical sequence by designating "q" or back to the original choice of operations by designating "qq." Of course, the invention contemplates any designation of letters, numbers, combinations of letters and numbers, or any other method of communication with the processor 16 to indicate a reverse step in the prompting sequence. The user may utilize this capability to move between input 34, change 38, run 42, test 46 and other operations. Consequently, the user has full control to decide to modify none of the generic default format commands or to specify as many parameters as the user desires to be different from the default format commands. To define a format of a printout, the process minimally requires only designation of data, frequency and interval.

After the user has completed the desired modification of the generic default format commands, creating custom default format commands, the report is ready to be printed. The user has by this point either designated data designating a data base and a mnemonic to designate data in the data base or has entered data through the terminal 12 into the processor memory 18. A maximum of 100 lines of data may be entered as desired. If the user prints out the data according to the commands, the user is presented with a prompting stimulus indicating that the user is to choose a frequency. After the user chooses a frequency of data points to be represented, e.g., monthly, quarterly, annually, the user is presented with a prompting stimulus indicating that the user is to choose an interval of time to be represented. If the user designated a monthly frequency, then a beginning month and year and ending month and year should be specified by the user. If the user designated a quarterly frequency, then a beginning quarter and year and ending quarter and year should be specified. If annual frequency is selected only a beginning year and ending year are required to be designated.

Subsequent to user specification of frequency and interval, the processor 16 electronically reproduces designated data from the long-term memory 20 in the processor memory 18. Alternatively, the data is already present in the processor memory 18 because it was entered there directly by the user of the terminal 12. The processor 16 then electronically converts the custom default format commands and data recorded on the processor memory 18 into electrical impulses to direct a printer 14 to print out the data according to the parameters specified by the commands.

The conversion of the commands into electrical impulses is accomplished by line-by-line translation of the command list into the universal code for running a printer. Because this code is standardized, any commercial printer will be directed by the resulting electrical impulses or code.

As an alternative to immediate incorporation of user commands with default commands, the user commands can be stored in the processor memory 18 and, at an appropriate time incorporated with the generic default format commands to specify any parameters which the user chooses not to specify.

The custom default format commands may be stored in the long-term memory 20 for later retrieval. They are retrieved from the long-term memory 20 and reproduced on the processor memory 18 upon appropriate user command. The custom default commands are then ready to be run or may be modified exactly as if they were the generic default format commands. Many different sets of custom default commands can be stored in the long-term memory 20 so that desired graphic representations may be periodically reproduced without the user needing to again specify any of the desired parameters.

The sets of custom default format commands include designations of data but do not include the data itself. This is advantageous because the user does not need to redesignate data or erase old data. The custom default format commands, when run, will designate data from the long-term memory 20 to be printed out. This means that new or updated data stored in the long-term memory 20 is automatically printed. Also, the frequency and interval of updated runs can be modified without modifying a list of custom default format commands.

The present invention is not limited to operation of the present process in a general purpose computer. It is contemplated that any electronic, electromagnetic, electromechanical or mechanical components may be used. It is understood that any electronic communications between processor 16 and the user terminal could be accomplished by mechanical, electromechanical or electromagnetic means as well as electronic means.

Communication between the processor 16 and the long-term memory 20 will, preferably, be by electronic means. However, the invention contemplates that other means of communication, such as electromechanic, electromagnetic and mechanical mean may be used.

The term "reproduction" in reference to data or commands refers to transfer of data without erasing the originally stored data. For example, reproduction of data from the long-term memory 20 into the processor memory 18 means that the data remains intact in the long-term memory 20 but now also appears in the processor memory 18. The term "record" means to place data or commands into the location referred to without indication of what occurs to the source. For example, recording data in the processor memory 18 implies only that it is put into the processor memory 18. The term "to store" implies that the information, i.e., data, commands, object code etc., is available for retrieval.

The present invention is further explicated by the following examples of the preferred embodiment.

EXAMPLE I

The user logs on to the computer and enters the format or report generator program. The following prompting stimuli are presented on the user terminal by the computer. The following commands were responses given by the user by keying in the letters and depressing the send key. Explanations of commands are given inside parenthesis. The period at the beginning of the user command is presented by the computer to indicate that the processor is ready to receive a command and does not need to be designated by the user.

Prompting Stimulus - REPORTS: INPUT, LOOK, TEST, CHANGE, RUN, SAVE OR ERASE
Command - .i (chooses the INPUT operation)
Prompting Stimulus - FROM FILE OR TERMINAL
Command - .t (Input from terminal)
Prompting Stimulus - TYPE: TIME SERIES OR USER DEFINED
Command - .t (Maximum interaction, unexperienced user)
Prompting Stimulus - BODY: ENTER DATABASE NAME.
Command - .us (US database designated)

-continued

Prompting Stimulus - LINES: ENTER MNEMONIC/KEYWORD SPECIFICATIONS OR
LINE 1
Command - .- (a dashed line appears in line 1, separating the
body from the title)
Prompting Stimulus - LINE 2
Command - .& subhead output (creates subheading "output")
Prompting Stimulus - LINE 3
Command - .& subhead - (underscores the subheading)
Prompting Stimulus - LINE 4
Command - gnp$ gnp-current dollars     (Mnemonic designating data for
                                        GNP in current dollars, the
                                        data will appear on line 4
                                        preceded by label "GNP -
                                        Current Dollars")
Prompting Stimulus - LINE 5
Command - .& % (line 5 will contain percent change in GNP$ from
previous quarter - subhead of "% Change" will appear)
Prompting Stimulus - LINE 6
Command - .& % p (line 6 will contain percent change in GNP$ from the
same quarter of the previous year - subhead "% Change
Year-to-Year" will appear)
Prompting Stimulus - LINE 7
Command - .& blank (line 7 will contain a blank space)
Prompting Stimulus - LINE 8
Command - . (no text designated may indicate user's desire to
change data base designation)
Prompting Stimulus - BODY: ENTER DATABASE NAME
Command - .usefile (Mnemonic for user created database, different from
US database for data above)
Prompting Stimulus - LINES: ENTER MNEMONIC/KEYWORD SPECIFICATION OR?
LINE 8
Command - .pdgnp implicit price deflator (data and label in line 8)
Prompting Stimulus - LINE 9
Command - .& % (line 9 will contain present change in PDGNP from
previous quarter)
Prompting Stimulus - LINE 10
Command - .& % p (line 10 will contain percent change in PDGNP
from the same quarter of the previous year)
Prompting Stimulus - LINE 11
Command - .& blank (line 11 left blank)
Prompting Stimulus - LINE 12
Command - .- (line 12 contains a continuous dashed line separating
the body of the report from the footnotes)
Prompting Stimulus - LINE 13
Command - .q ("quit" line-by-line text designation is complete)
Prompting Stimulus - FEATURES: BODY, TITLE, FOOTNOTES, PAGE FORMAT,
OR LINE-TOTALS
Command - .b (body of printout to be specified)
Prompting Stimulus - BODY: LINES, DATABASE, INDENTATIONS, OR PRECISION?
Command - .p (precision of data to be set)
Prompting Stimulus - ENTER LINE NUMBER OR MNEMONIC AND NUMBER OF DIGITS
TO THE RIGHT OF THE DECIMAL POINT.
Command -  .4  0  (set no digits to the right of decimal in
          .8  0  line 4 - GNP$ and line 8 - PDGNP)
          .q
Prompting Stimulus - BODY: LINES DATABASE, INDENTATIONS, OR PRECISION?
Command - .q (quit)
Prompting Stimulus - FEATURES: BODY, TITLE, FOOTNOTES, PAGE FORMAT,
OR LINE-TOTALS?
Command - .t (Title to be specified)
Prompting Stimulus - ENTER TITLE, MAXIMUM 5 LINES.
Command - indicators (title to be "INDICATORS")
.q
Prompting Stimulus - FEATURES: BODY, TITLE, FOOTNOTES, PAGE FORMAT,
OR LINE-TOTALS?
Command - .f (footnotes to be specified)
Prompting Stimulus - ENTER FOOTNOTES, MAXIMUM 5 LINES.
Command -   .data source: bureau of economic analysis
            .all data are seasonably adjusted
            .q   (test of footnotes specified line-by-line)
Prompting Stimulus - FEATURES: BODY, TITLE, FOOTNOTES, PAGE FORMAT,
OR LINE-TOTALS?
Command - .q (Input is complete)

EXAMPLE II

The above format commands are printed out by the following interaction.

Prompting Stimulus -REPORTS: INPUT, LOOK, TEST, CHANGE, RUN, SAVE, OR ERASE?
Command - .r (Run designated, command to print out a formatted printout)
Prompting Stimulus - FROM FILE OR WORK SPACE?
Command - .w (commands from work space)
Prompting Stimulus - FREQUENCY: MONTHLY, QUARTERLY, ANNUALLY
Command - .q (quarterly data points to be listed in body of report)
Prompting Stimulus - BEGINNING, ENDING QUARTER AND YEAR
Command - .1 80 4 80 (4 quarters of 1980 to be displayed in report)
Prompting Stimulus - SET PAPER AND PRESS CARRIAGE RETURN
Command - (carriage return pressed when ready to print out)

The resulting report looks like this:

| 01/26/82 | | | | Page 1 |
|---|---|---|---|---|
| | \multicolumn{4}{c}{INDICATORS} | |
| | 1Q/80 | 2Q/80 | 3Q/80 | 4Q/80 |
| OUTPUT | | | | |
| GNP-CURRENT DOLLARS | 2572 | 2565 | 2637 | 2731 |
| % CHANGE | 3.0 | −0.3 | 2.8 | 3.5 |
| % CHANGE - YR TO YR | 9.9 | 8.0 | 7.9 | 9.4 |
| IMPLICIT PRICE DE-FLATOR | 171 | 175 | 179 | 183 |
| % CHANGE | 2.2 | 2.4 | 2.2 | 2.6 |
| % CHANGE - YR TO YR | 8.3 | 8.8 | 9.1 | 9.8 |

DATA SOURCE: BUREAU OF ECONOMIC ANALYSIS
ALL DATA ARE SEASONALLY ADJUSTED

Example III

The following interaction illustrates the change operation.

Prompting Stimulus - REPORTS: INPUT, LOOK, TEST, CHANGE, RUN, SAVE OR ERASE
Command - .c (enter change section)
Prompting Stimulus - CHANGE: BODY, TITLE, FOOTNOTES, PAGE FORMAT, OR LINE-TOTALS?
Command - .b (body to be changed)
Prompting Stimulus - BODY: LINES, DATABASES, INDENTATIONS, OR PRECISION?
Command - .l (lines in body to be changed)
Prompting Stimulus - LINES: MODIFY, APPEND, INSERT, DELETE, REPLACE, OR LOCATE?
Command - .l (locate specified alphanumeric string)
Prompting Stimulus - ENTER STRING TO BE LOCATED
Command - .output (locate "output" string)
Prompting Stimulus - 2. SUBHEAD OUTPUT
LINES: MODIFY, APPEND, INSERT, DETELE, REPLACE, OR LOCATE?
Command - .a (append "output" line)
Prompting Stimulus - ENTER LINE NUMBER FOLLOWED BY CHARACTER STRING TO BE APPENDED ON TO LINE.
Command - .2 gnp (line 2 will now printout as "OUTPUT GNP")

It is thus clearly seen that the present invention provides a significant increase in accessibility to computer generated, versatile, highly variable formatted printouts of data. Periodic regeneration of desired formats with new or updated data is now simple and easy for untrained users.

From the above description it will be apparent that there is thus provided a process and system of the advantage before mentioned as desirable, but which obviously is susceptible to modification in its form, method, operation, detailed construction and arrangement without departing from the principles involved or sacrificing any of its advantages.

It is to be understood that the invention is not limited to the specific features shown, but that the means, method and construction herein disclosed comprise the preferred form of several modes of putting the invention into effect, and the invention is, therefore, claimed in any of its forms or modifications within the legitimate and valid scope of the appended claims.

We claim:

1. A process for electronically generating a format for a computer printout according to commands of a user communicating with a processor, the processor having a memory and further communicating with a long-term memory, the long-term memory storing a set of generic default format commands, the process comprising the steps of:

(a) reproducing the default format commands in the processor memory;

(b) modifying the default format commands reproduced in the processor memory according to prompted user format commands to create a set of custom default format commands;

(c) recording data in the processor memory;

(d) converting the custom default format commands and data recorded in the processor memory into electrical impulses to direct a printer to represent the data according to the format specified by the commands.

2. The process of claim 1 wherein the sequence of steps in first (a), second (b), third (c) and fourth (d).

3. The process of claim 1 wherein each prompted user format command is selected from a menu of format command choices presented in combination with each of a sequence of prompting stimuli.

4. The process of claim 1 or 2 wherein substantially simultaneous to the conversion of the custom default format commands and data into electrical impulses to direct a printer, the custom default format commands are reproduced in the long-term memory.

5. The process of claim 1 wherein the default format commands reproduced in the processor memory from the long-term memory are custom default format commands previously stored in the long-term memory.

6. The process of claim 1 wherein the modifications of the generic default format commands are accomplished by a logical sequence of prompting stimuli.

7. The process of claim 6 wherein succeeding prompting stimuli are determined by the prior format command choices, thereby shortening the sequence of prompting stimuli presented to the user to only those prompting stimuli relevant to the particular format and data specified by previous commands.

8. The process of claim 1 wherein the data is recorded in the processor memory directly by the user.

9. The process of claim 1 wherein the data is stored in the long-term memory and wherein the data is recorded in the processor memory by user designation of data stored in the long-term memory followed by reproduction of the designated data in the processor memory.

10. The process of claim 3 wherein the sequence of prompting stimuli includes a request for an alphanumerical response as a command.

11. The process of claim 10 wherein the alphanumeric response is a data base designation.

12. The process of claim 10 wherein the alphanumeric response is a file name designation.

13. The process of claim 10 wherein the alphanumeric response is a mnemonic designation.

14. The process of claim 10 wherein the alphanumeric response is a word to be included in the printout of data.

15. The process of claim 1 wherein the generic default format commands specify all the parameters of the format except for the data, an interval of time to be represented and a frequency of data to be represented.

16. A process for electronically generating a format for a computer printout from a series of commands comprising the steps of:
(a) prompting a series of commands by a user, the commands defining the format;
(b) recording the series of user commands;
(c) incorporating a series of generic default format commands with the user commands;
(d) recording data designated by the user; and
(e) converting the recorded commands and data into electrical impulses to direct a printer to represent the data according to the format specified by the commands.

17. The process of claim 16 wherein the electronic prompting includes a sequence of presentation of prompting stimuli, and wherein each prompting stimulus is presented in combination with a menu of possible command choices relating to the particular prompting stimulus.

18. The process of claim 17 wherein the sequence of prompting stimuli also includes a request for an alphanumeric response as a command.

19. The process of claim 18 wherein the sequence of presentation of prompting stimuli is determined by preceding commands.

20. The process of claim 16 wherein the series of user commands are recorded in the processor memory of the computer.

21. The process of claim 16 wherein the default format commands are stored in a long-term memory and are reproduced in the processor memory and wherein the user commands modify the default format commands in the processor memory and wherein the modified default format commands are stored in the long-term memory as custom default format commands, thereby allowing the user to later retrieve the custom default commands.

22. The process of claim 16 wherein the user communicates with a processor which further communicates with a processor memory and wherein the commands and data are recorded in the processor memory.

23. The process of claim 22 wherein the recording of data is accomplished by user designation of data stored in a long-term memory communicating with the processor, followed by reproduction of the data in the processor memory.

24. A process for electronically generating a format for a computer printout according to commands of a user, the user communicating with a processor having a memory, the process comprising the steps of:
(a) presenting a sequence of prompting stimuli to the user;
(b) presenting a menu of command choices in combination with the prompting stimuli; and
(c) the user selecting commands from the menus;
wherein the sequence of prompting stimuli comprises:
first, presenting the user with prompting stimuli indicating that a choice of operations is to be made, the stimuli is presented in combination with a menu of command choices including to input new commands, to change commands already stored in the processor memory and to print out according to commands already stored; and
second, a further prompting stimulus dependent upon the command choice selected by the user.

25. The process of claim 24 wherin the user selects the command to input new commands and wherein the second prompting stimulus indicates that a choice of a source of the input is to be made, the stimulus is presented in combination with a menu of command choices including from previously stored commands and from the terminal.

26. The process of claim 25 wherein the user selects the command to input from the terminal and further comprising a third prompting stimulus indicating that a choice of type of format definition mode is to be made, the stimulus is presented in combination with a menu of command choices including to require maximum interaction and to require language responses.

27. The process of claim 26 wherein the user selects the command to require maximum interaction and further comprising a fourth prompting stimulus indicating that a choice of text to make up the body of the printout is to be designated and indicating a line number of the body wherein each designation of text by the user is followed by the iteration of the fourth prompting stimulus with the line number increased by one.

28. The process of claim 26 wherein the user selects the command to require maximum interaction and further comprising a fourth prompting stimulus indicating that a designation of a data base is to be made, wherein user selection of a data base results in presentation of a fifth prompting stimulus indicating that the user is to designate text by an alphanumeric response selected from the group consisting of a mnemonic and a keyword, the fifth prompting stimulus is presented with an indication of a line number of the body to contain the designated text.

29. The process of claim 28 wherein each alphanumeric response is followed by an indication that another alphanumeric response is to be designated for the text of the next line of the body.

30. The process of claim 29 wherein the user may respond to presentation of the fifth stimulus by directing to change the data base designation and wherein the fourth stimulus again is presented.

31. The process of claim 30 wherein the user responds to presentation of fifth stimulus by directing that no further text of lines in the body is designated and further comprising a sixth prompting stimulus indicating that a choice of format feature is to be made, the sixth prompting stimulus is presented in combination with a menu of command choices including page format feature, body feature and line-totals feature.

32. The process of claim 30 wherein the user responds to the presentation of the fourth stimulus by directing that no further lines of text in the body are designated and further comprising a sixth prompting stimulus indicating that a choice of format feature is to be made, the sixth prompting stimulus is presented in combination with a menu of command choices, including page format feature, body feature, and line-totals feature.

33. The process of claim 31 or 32 wherein the user selects the page format feature and further comprising a seventh prompting stimuli indicating that a choice of type of change to the page format is to be made, the seventh prompting stimulus is presented in combination with a menu of command choices including columns, date, page number, run-title, label width and size.

34. The process of claim 31 or 32 wherein the user selects the body format feature and further comprising a seventh prompting stimuli indicating that a choice of type of change to the body is to be made, the seventh prompting stimulus is presented in combination with a menu of command choices including lines, data-base, indentation and precision.

35. The process of claim 34 wherein the user selects to change lines, and further comprising an eighth stimulus indicating the line number immediately subsequent to the last line of text designated and further indicating that a choice of text to make up that line is to be selected.

36. The process of claim 35 wherein each time the user chooses a designation of text the eighth stimulus is presented with line number increased by one.

37. The process of claim 31 or 32 wheren the user selects the line totals feature and further comprising a seventh prompting stimuli indicating that a choice of whether to insert or delete line totals is to be made, the seventh prompting stimulus is presented in combination with a menu of command choices including insert and delete.

38. The process of claim 24 wherein the user selects to change commands in the processor memory and wherein the second prompting stimulus indicates that a choice of the part of the format to be changed is to be made, the second prompting stimulus is presented in combination with a menu of command choices including page format, title, body, footnotes and line-totals.

39. The process of claim 38 wherein the user selects to change the page format and further comprising a third prompting stimulus indicating that a choice of type of change to the page format is to be made, the third prompting stimulus is presented in combination with a menu of command choices including columns, run title, date, label width, page number and size.

40. The process of claim 38 wherein the user selects to change the title and further comprising a third prompting stimulus indicating that a type of change to the title is to be made, the third prompting stimulus is presented in combination with a menu of command choices including modify, append, insert, delete, replace and locate.

41. The process of claim 38 wherein the user selects to change the body and further comprising a third prompting stimulus indicating that a choice of part of the body to be changed is to be made, the third prompting stimulus is presented in combination with a menu of command choices including lines, data bases, indentation and precision.

42. The process of claim 41 wherein the user selects to change the lines of the body and further comprising a fourth prompting stimulus indicating that the type of change to the lines is to be made, the fourth prompting stimulus is presented in combination with a menu of command choices including modify, append, insert, delete, replace and locate.

43. The process of claim 38 wherein the user selects to change the footnotes part of the format and further comprising a third prompting stimulus indicating that a choice of type of change to the footnotes is to be made, the third prompting stimulus is presented in combination with a menu of command choices including modify, append, insert, delete, replace and locate.

44. The process of claim 38 wherein the user selects to change the line-totals and further comprising a third prompting stimulus indicating that a choice of whether to insert or delete line totals is to be made, the third prompting stimulus is presented in combination with a menu of command choices including to insert and to delete.

45. The process of claim 24 wherein the user selects to print out according to commands already stored and wherein the second prompting stimulus indicating that a choice of source of the commands to be printed out is to be made, the second prompting stimulus is presented in combination with a menu of command choices including from workspace and from file.

46. The process of claim 25 wherein the user selects to print out commands stored in the workspace and further comprising a third stimulus and a fourth stimulus indicating that a choice is to be made of frequency of data to be printed out and of interval of data to be printed out.

47. The process of claim 45 wherein the user selects to print out commands stored in the files and further comprising third, fourth, fifth and sixth stimuli indicating that a choice is to be made of file name designating the commands to print out that a choice is to be made of frequency of data to be printed out, that a choice is to be made of interval of data to be printed out, and that a choice is to be made of run title.

48. A system for electronically generating a format for a computer print out according to commands of a user communicating with a processor, the processor having a memory and further communicating with a long-term memory, the long term memory storing a set of generic default format commands, the system comprising:
  (a) means for reproducing the generic default format commands in the processor memory;
  (b) means for modifying the generic default format commands reproduced in the processor memory according to prompted user commands to create a set of custom default commands wherein each command is selected from a menu of command choices presented in combination with each of a sequence of prompting stimuli;
  (c) means for recording data with the default format commands on the processor memory; and
  (d) means for converting the custom default format commands and data recorded on the processor memory into electrical impulses to direct a printer to print out the data according to the commands.

49. A method for designating lines of text, to be printed by a computer controlled printer, the user communicating with a computer and computer further communicating with a printer, the method comprising the steps of:
  (a) the computer requesting that the user designate text for the first line to be printed;
  (b) the user communicating a designation of text to the computer;

(c) the computer responding to every user designation of text by requesting that the user designate text for the next line to be printed.

50. The method of claim 49 wherein the user may designate data to be printed on a line by specifying a mnemonic association with particular data stored in the computer.

51. The method of claim 50 wherein the user may designate text selected from the class consisting of a blank line, a row of hyphens, a centered label, a subheading, and a percentage of data.

52. The method of claim 51 further comprising a long-term memory communicating with the computer wherein data is stored in the long-term memory.

* * * * *